(12) United States Patent
Ward

(10) Patent No.: US 7,222,917 B2
(45) Date of Patent: May 29, 2007

(54) REVERSIBLE SEAT PAD

(75) Inventor: Michael P. Ward, Columbus, IN (US)

(73) Assignee: Cosco Management, Inc., Wilmington, DE (US)

( * ) Notice: Subject to any disclaimer, the term of this patent is extended or adjusted under 35 U.S.C. 154(b) by 279 days.

(21) Appl. No.: 10/960,214

(22) Filed: Oct. 7, 2004

(65) Prior Publication Data
US 2006/0076812 A1   Apr. 13, 2006

(51) Int. Cl.
A47C 27/00   (2006.01)
(52) U.S. Cl. ............ 297/223; 297/219.12; 297/256.14; 297/219.1; 297/219.11
(58) Field of Classification Search ........... 297/219.12, 297/219.1, 228.1, 223, 256.14, 250.1, 219.11, 297/184.13, 229
See application file for complete search history.

(56) References Cited

U.S. PATENT DOCUMENTS

| 4,457,032 A | 7/1984 | Clarke |
| 4,747,639 A * | 5/1988 | Pfau ......................... 297/219.1 |
| 4,773,702 A * | 9/1988 | Takahashi et al. ........ 297/218.1 |
| 4,775,183 A * | 10/1988 | Tsuge et al. ........... 297/219.12 |
| 4,886,697 A * | 12/1989 | Perdelwitz et al. ......... 428/192 |
| 4,969,683 A | 11/1990 | Wallace et al. |
| 5,005,903 A | 4/1991 | Minardi |
| 5,161,275 A * | 11/1992 | Simpson et al. ............... 5/627 |
| 5,366,271 A | 11/1994 | Johnston et al. |
| 5,806,696 A | 9/1998 | Hytonen |
| 5,829,829 A * | 11/1998 | Celestina-Krevh ..... 297/219.12 |
| 5,860,896 A | 1/1999 | Mann |
| 5,954,404 A * | 9/1999 | Suzuki ....................... 297/467 |
| 6,089,659 A | 7/2000 | Toyota |
| 6,164,721 A * | 12/2000 | Latshaw et al. ........ 297/256.17 |
| 6,296,307 B1 | 10/2001 | Holtke |
| 6,860,555 B2 * | 3/2005 | Kassai et al. .......... 297/219.12 |
| 6,926,359 B2 * | 8/2005 | Runk .................... 297/219.12 |
| 6,971,716 B2 * | 12/2005 | DePaulis et al. ............ 297/229 |

* cited by examiner

*Primary Examiner*—David R. Dunn
*Assistant Examiner*—Erika Garrett
(74) *Attorney, Agent, or Firm*—Barnes & Thornburg LLP

(57) ABSTRACT

A juvenile seat unit includes a seat and a reversible seat pad for the seat. Belt-receiving slots are formed in the reversible seat pad to receive belts coupled to the seat.

26 Claims, 5 Drawing Sheets

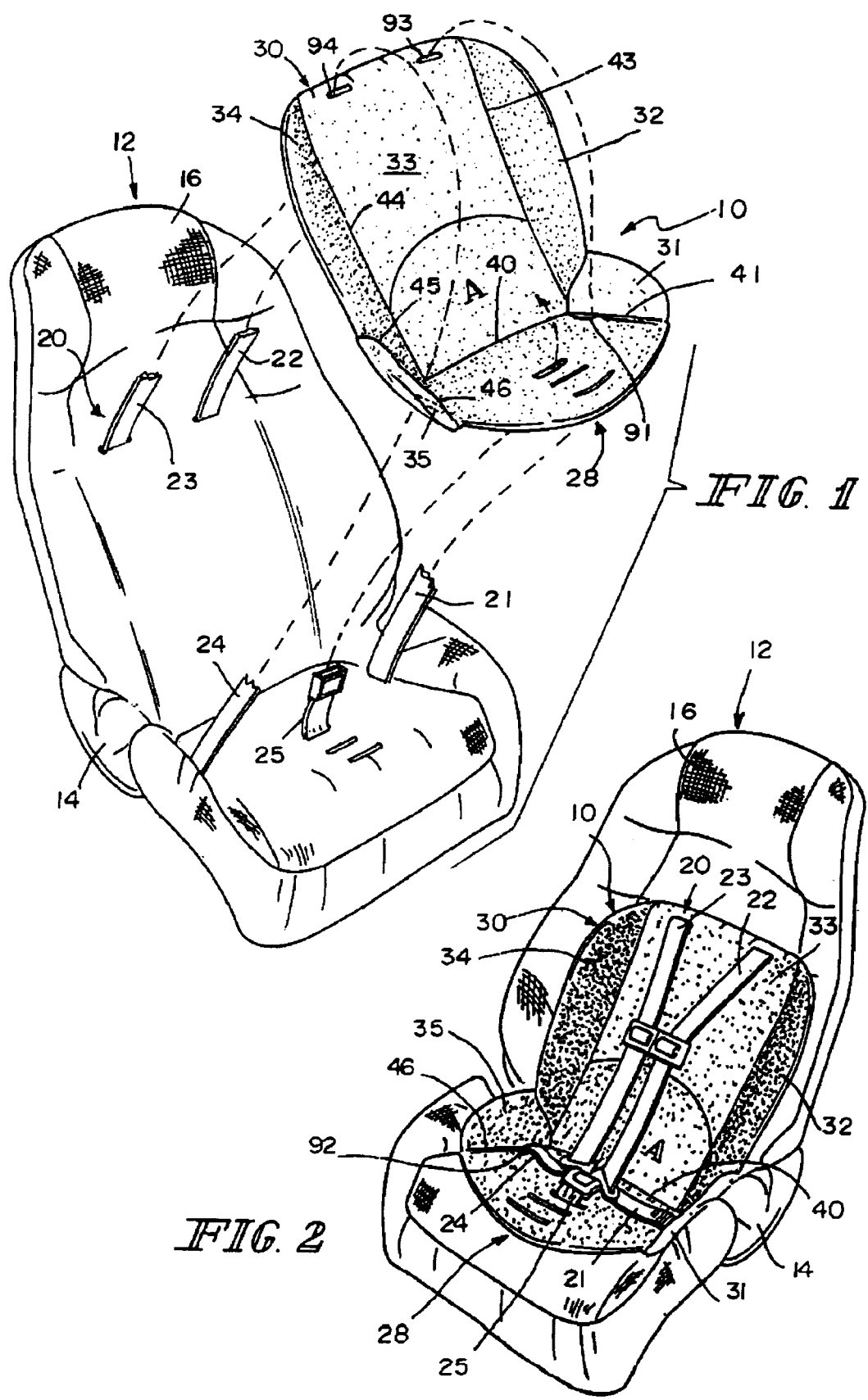

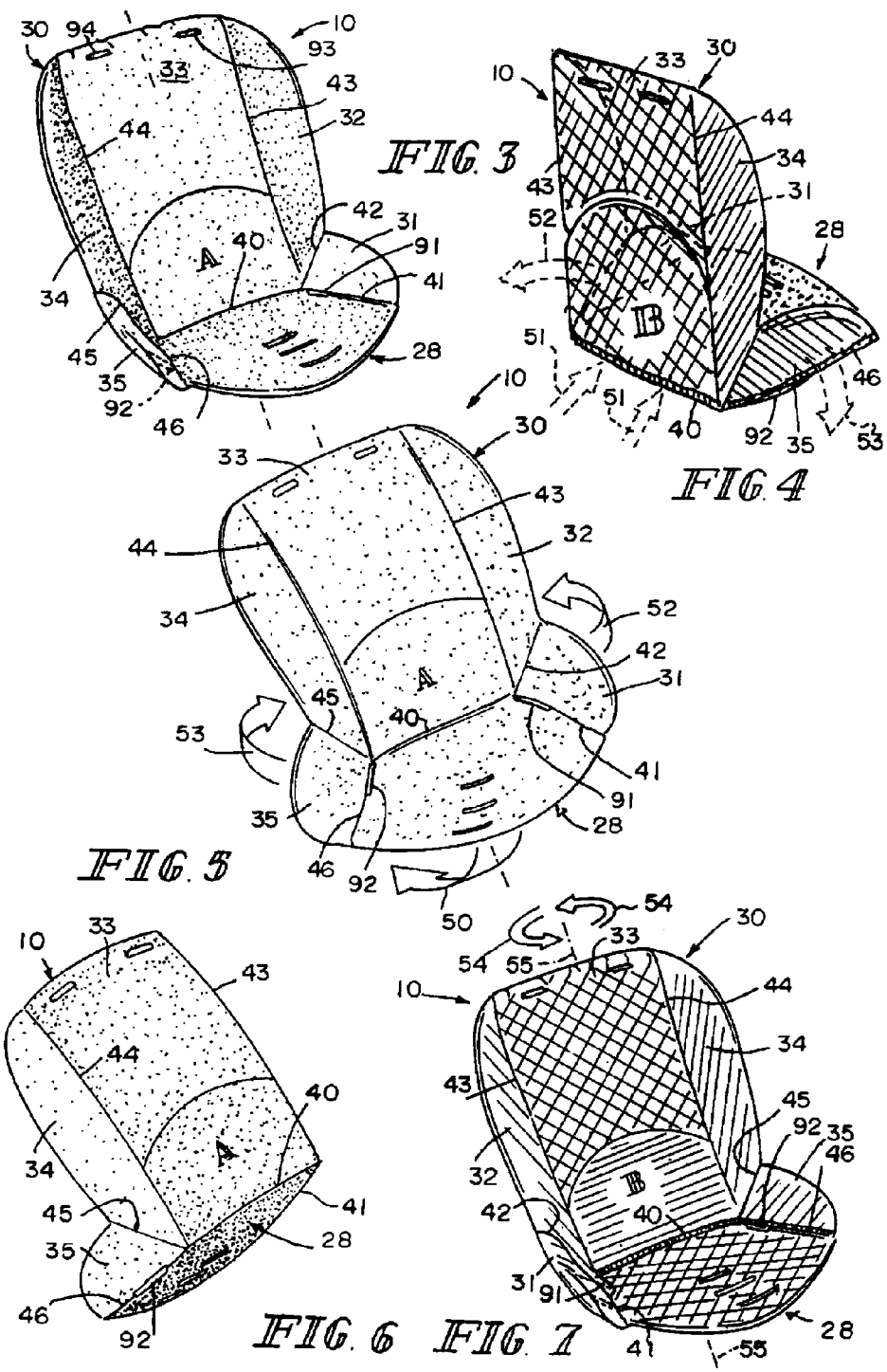

REVERSIBLE SEAT PAD

BACKGROUND

The present disclosure relates to a seat pad for use on a seat, and particularly to a seat pad to be mounted on a juvenile seat. More particularly, the present disclosure relates to a seat pad that is reversible so that it can be mounted on a juvenile seat either in a first position where its front face is visible or a reversed second position where its back face is visible.

Juvenile vehicle seats are used to transport young children in automobiles or other vehicles. Seats for infants are adapted to set on a vehicle seat and face in a rearward direction, while seats for older children are adapted to set on a vehicle seat and face in a forward direction. Pads are mounted on juvenile vehicle seat shells to provide support and cushioning for a child occupying the seat.

SUMMARY

A reversible seat pad in accordance with the present disclosure includes an upper cushion coupled to a pad bottom along a fold line. The upper cushion provides a backrest and cooperates with the pad bottom to define oppositely facing first and second seating sides. In an illustrative embodiment, one design pattern is provided on the first seating side while another design pattern is provided on the second seating side to provide a caregiver with two different appearance options for the seat pad.

By folding the upper cushion along several fold lines relative to the pad bottom, the seating side can be reversed. In use, the reversible seat pad is movable relative to an underlying juvenile vehicle seat between first and second positions. In the first position, the second seating side faces the seat and the first seating side faces away from the seat to permit a seat occupant to sit on the first seating side. In the "reversed" second position, the first seating side faces the seat and the second seating side faces away from the seat to permit a seat occupant to sit on the second seating side.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view showing how a reversible seat pad in accordance with the present disclosure can be installed on a juvenile vehicle seat so that side "A" is visible;

FIG. 2 is a perspective view of the reversible seat pad of FIG. 1 installed on the juvenile vehicle seat of FIG. 1 showing passage of various straps included in the juvenile vehicle seat through various slots formed in the reversible seat pad;

FIGS. 3–7 show how the reversible seat pad can be manipulated by a user so that it can be "reversed" from a first position shown in FIG. 2 to a second position shown in FIG. 7;

DETAILED DESCRIPTION

Figure 7A:
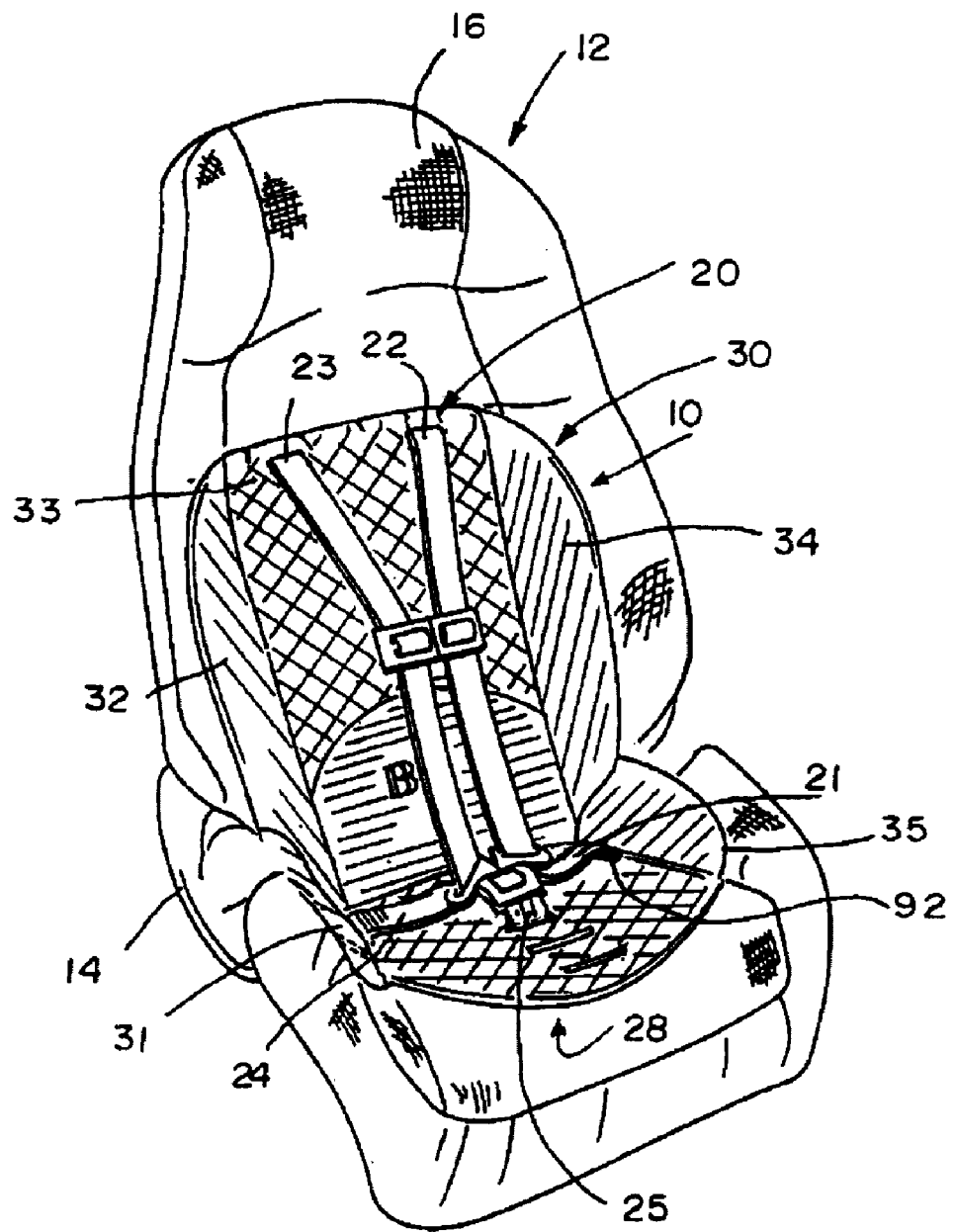
FIG. 7A is a perspective view of the reversible seat pad of FIGS. 1–7 installed on the juvenile vehicle seat so that side "B" is visible.

A reversible seat pad 10 is adapted, as suggested in FIG. 1, to be anchored to a juvenile vehicle seat 12 either (1) in a first position as shown in FIG. 2 so that a seat occupant (not shown) may sit on a first seating side "A" of reversible seat 10 or (2) in a "reversed" second position as shown in FIG. 7A so that the seat occupant may sit on a second seating side "b" of reversible seat 10. By folding reversible seat pad 10 along several fold lines as suggested in FIGS. 3–7, the seating side of seat pad 10 can be reversed.

In an illustrative embodiment, juvenile vehicle seat 12 includes a shell 14 made of plastics or other sturdy material and an optional cover 16 coupled to shell 14. Either one of shell 14 or cover 16 provides a suitable pad-receiving surface on which to place reversible seat pad 10. A five-point harness 20 (or other suitable child restraint system) comprising belts 21, 22, 23, 24, and 25 is coupled to shell and adapted to restrain a child seated on juvenile vehicle seat 12.

Figure 10:
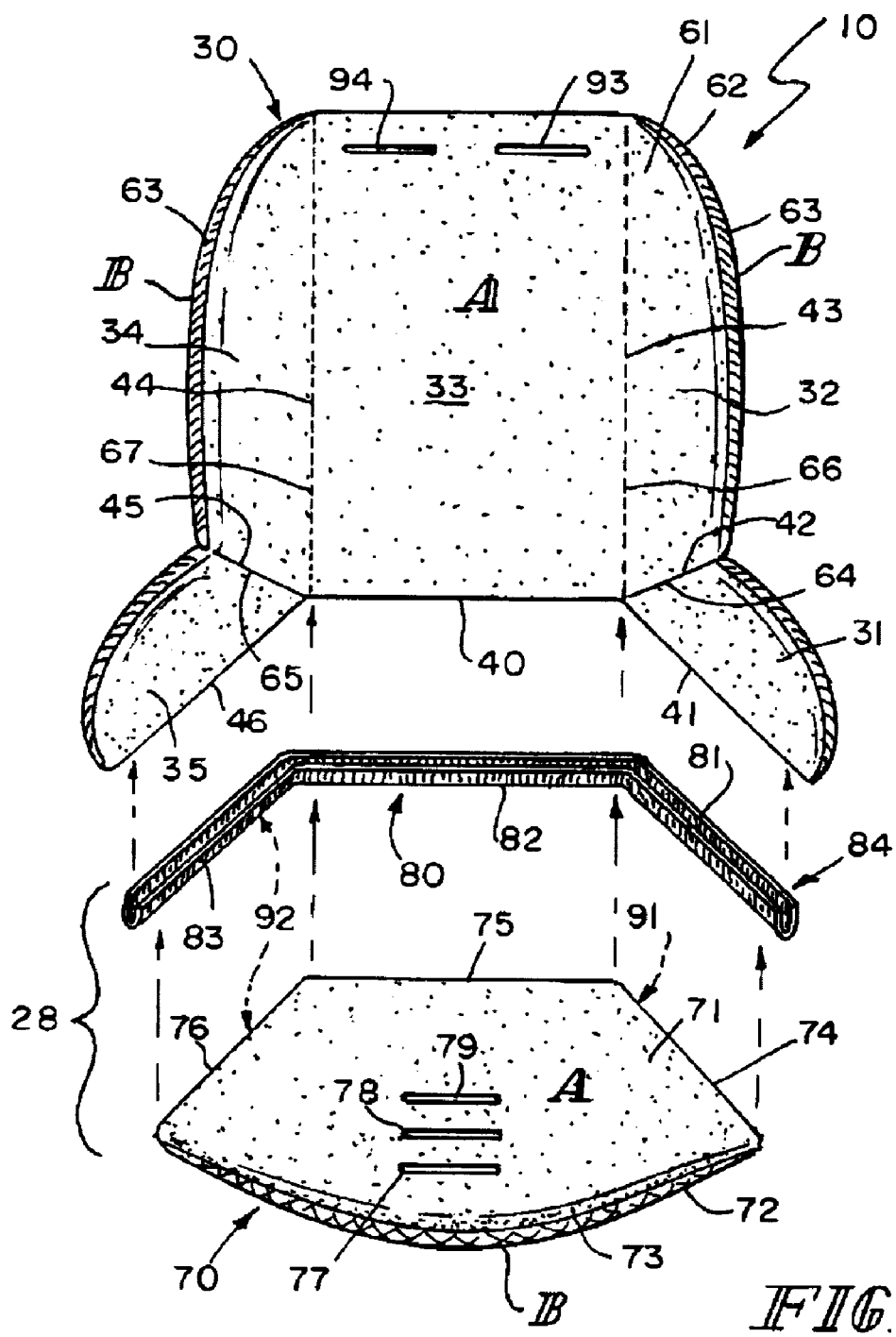
FIG. 10 is an exploded assembly view of the reversible pad of FIGS. 1–9 comprising an upper cushion including (from right to left) a first lower side wing, a first upper side wing, a backrest, a second upper side wing, and a second lower side wing, and a pad bottom comprising a perimeter band including three band sections and a lower cushion.

Reversible seat pad 10 includes an upper cushion 30 and a pad bottom 28 as shown, for example, in FIGS. 1, 2, and 10. Upper cushion 30 includes, in series, a first upright lower side wing 31 coupled to pad bottom 28 along a first lower fold line 41, a first upper side wing 32 coupled to first upright lower side wing 31 along a first upper fold line 42, a backrest 33 coupled to first upper side wing 32 along a first vertical fold line 43 and to pad bottom 28 along main fold line 40, a second upper side wing 34 coupled to backrest 33 along a second vertical fold line 44, and a second upright lower side wing 35 coupled to second upper side wing 34 along a second upper fold line 45 and to pad bottom 28 along a second lower fold line 46. In the illustrated embodiment, first upper side wing 32, backrest 33, and second upper side wing 33 cooperate to define a pad back.

Reversible seat pad 10 is foldable along fold lines 41–46 as suggested in FIGS. 3–7 to move between a first position shown in FIG. 3 to a second position shown in FIG. 7. In the first position, second seating side "B" faces toward the pad-receiving surface on juvenile vehicle seat 12 and first seating side "A" faces away from that pad-receiving surface to permit a seat occupant to sit thereon as suggested in FIG. 2. In the second position, first seating side "A" faces toward the pad-receiving surface on juvenile vehicle seat 12 and second seating side "B" faces away from that pad-receiving surface to permit a seat occupant to sit thereon as suggested in FIG. 7A.

As suggested in FIG. 4, one way to initiate "reversal" of seat pad 10 is to apply force to main fold line 40 in direction 51 while moving (e.g., pivoting) first upright lower side wall 31 in direction 52 about first lower fold line 41 away from pad bottom 28 and moving (e.g., pivoting) second upright lower side wall 35 in direction 53 about second lower fold line 46 away from pad bottom 28. As suggested in FIG. 5, pad bottom 28 moves (e.g., pivots) in direction 50 about main fold line 40 relative to backrest 33 while first upright lower side wall 31 continues to move in direction 52 and second upright lower side wall 35 continues to move in direction 53. Such movement continues until reversible seat pad 10 assumes the second position shown in FIG. 6. Finally, seat pad 10 is rotated in counterclockwise direction 54 about vertical axis 55 to assume the orientation shown in FIG. 7 so that seat pad 10 can be deployed in juvenile vehicle seat 12 as shown in FIG. 7.

As suggested in FIGS. 1 and 2, first and second upper fold lines 42, 45 are arranged to converge in a direction toward main fold line 40. As suggested in FIGS. 8 and 9, first and second upper side wings 32, 34 are arranged to converge in a direction toward backrest 33. Also, first and second upright lower side wings 31, 35 are arranged to converge in a direction toward backrest 33. In the illustrated embodiment, first upright lower side wing 31 and first upper side wing 35 are arranged to lie in substantially "in-line" relation to one another while second upright lower side wing 35 and second upper side wing 34 are arranged to lie in substantially "in-line" relation to one another as suggested in FIGS. 8 and 9.

As suggested in FIG. 1, first lower fold line 41 meets main fold line 40 to establish a first corner junction therebetween and first upper fold line 42 extends to that first corner junction. As suggested in FIG. 2, second lower fold line 46 meets main fold line 40 to establish a second corner junction therebetween and second upper fold line 45 extends to that second corner junction.

Figure 9:
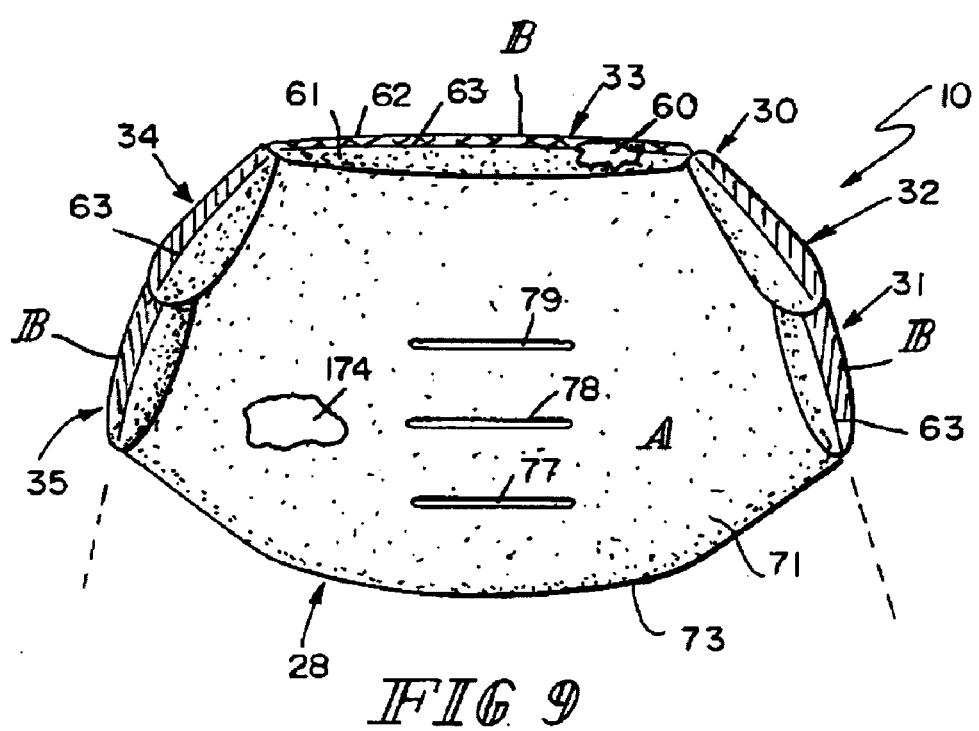
FIG. 9 is a top plan view of the reversible pad in the first position (shown in FIG. 2) wherein the first lower and upper side wings are arranged to lie in substantially "in-line" relation to one another on the "right" side of the pad bottom and the second lower and upper side wings are arranged to lie in substantially in-line relation to one another on the "left" side of the pad bottom.

In an illustrative embodiment shown best in FIGS. 9 and 10, upper cushion 30 comprises a first sheet of material 61 coupled to a second sheet of material 62 along a perimeter seam 63 to trap a first padding material 60 therebetween. A first stitching 64 fastens first sheet 61 to second sheet 62 to establish first upper fold line 42. A second stitching 65 fastens first sheet 61 to second sheet 62 to establish second upper fold line 45. A third stitching 66 fastens first sheet 61 to second sheet 62 to establish first vertical fold line 43. A fourth stitching 67 fastens first sheet 61 to second sheet 62 to establish second vertical fold line 44. In an illustrative embodiment, first sheet of material 61 is made of a suitable fabric having a first pattern "A" and second sheet of material 62 is made of a suitable fabric having a second pattern "B."

As shown in FIG. 10, first and second upper fold lines 42, 45 partition first and second sheets of material 61, 62 to define, in series, first upright lower side wing 31, pad back (32, 33, 34), and second upright lower side wing 35. First and second vertical fold lines 43, 44 partition the pad back to define, in series, first upper side wing 32, backrest 33, and second upper side wing 34.

Pad bottom 28 includes a lower cushion 70 and a perimeter band 80 as shown, for example, in FIG. 10. In the illustrated embodiment, lower cushion 70 is coupled to perimeter band 80 and perimeter band 80 is coupled to upper cushion 30 to provide reversible seat pad 10.

Figure 8:
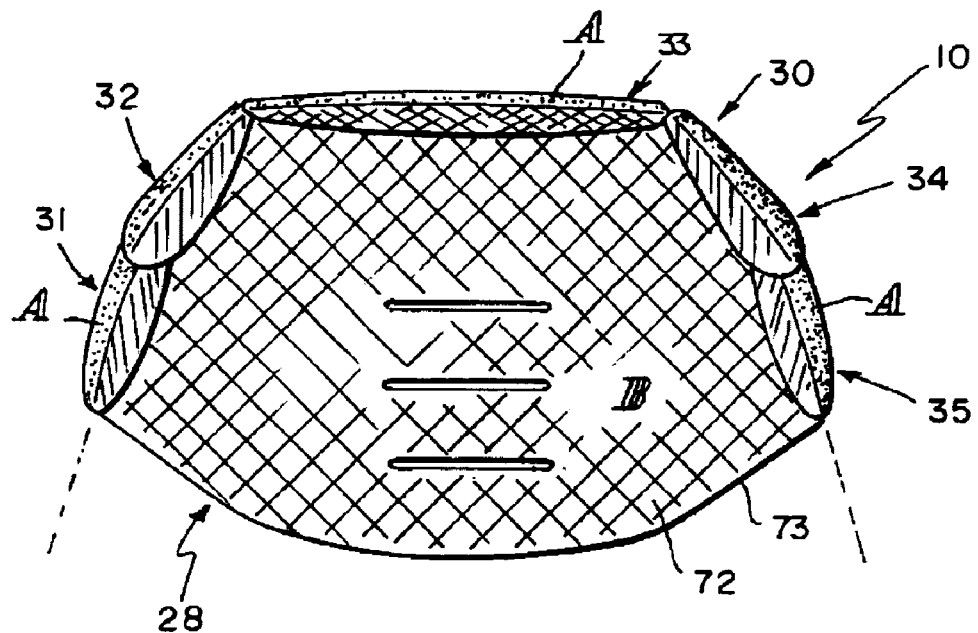
FIG. 8 is a top plan of the reversible pad in the second position (shown in FIG. 7A) wherein first lower and upper side wings are arranged to lie in substantially "in-line" relation to one another on the "left" side of the pad bottom and second lower and upper side wings are arranged to lie in substantially in-line relation to one another on the "right" side of the pad bottom and wherein the first and second upright lower side wings are arranged to converge in a direction toward a backrest located between the first and second upper side wings.

In an illustrative embodiment shown best in FIGS. 8–10, lower cushion 70 comprises a third sheet of material 71 coupled to a fourth sheet of material 72 along a perimeter seam 73 to trap a second padding material 174 therebetween. Lower cushion 70 includes, in series, first, second, and third perimeter edge portions 74, 75, 76 as shown, for example, in FIG. 10. In the illustrated embodiment, lower cushion 70 is formed to include three belt-receiving slots 77, 78, 79. Each of these slots is adapted to receive crotch belt 25 therein when seat pad 10 is mounted on juvenile vehicle seat 12.

Perimeter band 80 includes first, second, and third band sections 81, 82, 83 as shown, for example, in FIG. 10. Perimeter band 80 is made, illustratively, of a fabric material and folded in half along its length to form an upwardly-opening channel 84 receiving a lower edge of cushion 30 therein.

As suggested, for example, in FIGS. 7 and 10, first band section 81 is coupled to first edge portion 74 of lower cushion 70 to establish a first belt-receiving slot 91 between perimeter band 80 and lower cushion 70 along one side edge of lower cushion 70. Likewise, third band section 83 is coupled to third edge portion 76 of lower cushion 70 to establish a second belt-receiving slot 92 between perimeter band 80 and lower cushion 70 along another side edge of lower cushion 70. Further, second band section 82 is coupled to second edge portion 75 of lower cushion 70.

In the illustrated embodiment, first upright lower side wing 31 is coupled to first band section 81 of band 80 of pad bottom 28 to establish first lower fold line 41. Second upright lower side wing 35 is coupled to third band section 83 of band 80 of pad bottom 28 to establish second lower fold line 46. Also, backrest 33 of upper cushion 70 is coupled to second band section 82 of band 80 of pad bottom 28 to establish main fold line 41. Thus, first belt-receiving slot 91 is arranged to extend along first lower fold line 41 and second belt-receiving slot 92 is arranged to extend along second lower fold line 46.

When reversible seat pad 10 is moved to assume its first position on seat 12 as shown in FIG. 2, belt 21 passes through first belt-receiving slot 91 and belt 24 passes through second belt-receiving slot 92. In contrast, when seat pad 10 is moved to assume its second position on seat 12 as shown in FIG. 7, belt 21 passes through second belt-receiving slot 92 and belt 24 passes through first belt-receiving slot 91. Shoulder belts 22, 23 are arranged and sized to pass through slots 93, 94 formed in backrest 33 of upper cushion 30 as suggested in FIGS. 2 and 7A to retain shoulder belts 22, 23 in constant spaced-apart relation to one another during use.

First and third sheets of material 61, 71 cooperate to form first seating side "A" as suggested in FIG. 10. Second and fourth sheets of material 62, 72 cooperate to form second seating side "B."

The invention claimed is:

1. A seat unit comprising a seat including a pad-receiving surface and a reversible seat pad comprising a pad back, a pad bottom coupled to the pad back along a main fold line located therebetween, a first upright lower side wing coupled to the pad bottom along a first lower fold line located therebetween and to the pad back along a first upper fold line located therebetween to join permanently the first upright lower side wing to the pad back along the first upper fold line, and a second upright lower side wing coupled to the pad bottom along a second lower fold line located therebetween and to the pad back along a second upper fold line located therebetween to locate the pad bottom between the first and second upright lower side wings, the pad back, pad bottom, first upright lower side wing, and second upright lower side wing cooperating to define a first seating side and a second seating side, the reversible seat pad being foldable along the main and first and second lower and upper fold lines and movable relative to the seat between a first position wherein the second seating side faces toward the pad-receiving surface and the first seating side faces away from the pad-seating surface to permit a seat occupant to sit thereon and a second position wherein the first seating side faces toward the pad-receiving surface and the second seating side faces away from the pad-receiving surface to permit a seat occupant to sit thereon wherein the first upright lower side wing and the pad bottom cooperate to define a first belt-receiving side slot along the first lower fold line and wherein the second upright lower side wing and the pad bottom cooperate to define a second belt-receiving side slot along the second lower fold line.

2. The seat unit of claim 1, wherein the pad back includes a first upper side wing coupled to the first upright lower side wing along the first upper fold line, a second upper side wing coupled to the second upright lower side wing along the second upper fold line, and a backrest arranged to lie between the first and second upper side wings and coupled to the pad bottom along the main fold line and to each of the first and second upper side wings, respectively, along first and second vertical fold lines.

3. The seat unit of claim 2, wherein the first and second upper fold lines are arranged to converge in a direction toward the main fold line.

4. The seat unit of claim 3, wherein the first and second upper side wings are arranged to converge in a direction toward the backrest.

5. The seat unit of claim 3, wherein the first and second upright lower side wings are arranged to converge in a direction toward the backrest.

6. The seat unit of claim 2, wherein the first and second upper side wings are arranged to converge in a direction toward the backrest.

7. The seat unit of claim 2, wherein the first and second upright lower side wings are arranged to converge in a direction toward the backrest.

8. The seat unit of claim 2, wherein the first upright lower side wing and the first upper side wing are arranged to lie in substantially in-line relation to one another and wherein the second upright lower side wing and the second upper side wing are arranged to lie in substantially in-line relation to one another.

9. The seat unit of claim 1, wherein the pad back and the first and second upright lower side wings are defined by a first sheet material coupled to a second sheet material to trap a padding material therebetween and wherein the first and second sheet materials are stitched together using thread to establish the first and second upper fold lines.

10. The seat unit of claim 9, wherein the pad back includes a backrest, a first upper side wing coupled to the backrest along a first vertical fold line that is arranged to intersect the main fold line, and a second upper side wing coupled to the backrest along a second vertical fold line that is arranged to intersect the main fold line, and wherein the first and second sheets are stitched together using thread to establish the first and second vertical fold lines.

11. The seat unit of claim 1, wherein the first and second upper fold lines are arranged to converge in a direction toward the main fold line.

12. The seat unit of claim 11, wherein the first lower fold line meets the main fold line to establish a first corner junction therebetween and the first upper fold line extends to the first corner junction and wherein the second lower fold line meets the main fold line to establish a second corner junction therebetween and the second upper fold line extends to the second corner junction.

13. The seat unit of claim 12, wherein the first upright lower side wing and the pad bottom cooperate to define a first belt-receiving side slot along the first lower fold line and wherein the second upright lower side wing and the pad bottom cooperate to define a second belt-receiving side slot along the second lower fold line.

14. The seat unit of claim 12, wherein the pad back and the first and second upright lower side wings are defined by a first sheet material coupled to a second sheet material to trap a padding material therebetween and wherein the first and second sheet materials are stitched together using thread to establish the first and second upper fold lines.

15. The seat unit of claim 1, wherein the first upright lower side wing and the pad bottom cooperate to define a first belt-receiving side slot along the first lower fold line and wherein the second upright lower side wing and the pad bottom cooperate to define a second belt-receiving side slot along the second lower fold line.

16. The seat unit of claim 15, wherein the pad back and the first and second upright lower side wings are defined by a first sheet material coupled to a second sheet material to trap a padding material therebetween and wherein the first and second sheet materials are stitched together using thread to establish the first and second upper fold lines.

17. The seat unit of claim 1, wherein the pad bottom includes first and second sheets of material, a padding material, and a perimeter band, the first sheet of material is coupled to the second sheet of material to trap the padding material therebetween and establish a perimeter edge, the perimeter band is coupled to a portion of the perimeter edge to establish first, second, and third band sections, the first upright lower side wing is coupled to the first band section, the pad back is coupled to the second band section, and the second upright lower side wing is coupled to the third band section.

18. The seat unit of claim 17, wherein the first band section of the perimeter band is uncoupled to a portion of the perimeter edge to establish a first belt-receiving side slot therebetween and the third band section of the perimeter band is uncoupled to another portion of the perimeter edge to establish a second belt-receiving side slot therebetween.

19. A seat unit comprising a seat including a pad-receiving surface and a reversible seat pad comprising a pad bottom including a cushion having a perimeter edge and a separate perimeter band member coupled to separate portions of the perimeter edge to establish a first belt-receiving side slot between the perimeter band and the cushion along one side edge of the cushion and to establish a second belt-receiving side slot between the perimeter band and the cushion along another side edge of the cushion, a first upright lower side wing coupled to a first band section of the perimeter band to establish a first lower fold line therebetween and to locate the first belt-receiving side slot along the first lower fold line, a second upright lower side wing coupled to a third band section of the perimeter band to establish a second lower fold line therebetween and to locate the second belt-receiving side slot along the second lower fold line, and a pad back coupled to a second band section of the perimeter band located between the first and third band sections along a main fold line, the pad back also being coupled to the first upright lower side wing along a first upper fold line located therebetween and to the second upright lower side wing along a second upper fold line located therebetween, the pad back, pad bottom, first upright lower side wing, and second upright lower side wing cooperating to define a first seating side and a second seating side, the reversible seat pad being foldable along the main and first and second lower and upper fold lines and movable relative to the seat between a first position wherein the second seating side faces toward the pad-receiving surface and the first seating side faces away from the pad-seating surface to permit a seat occupant to sit thereon and a second position wherein the first seating side faces toward the pad-receiving surface and the second seating side faces away from the pad-receiving surface to permit a seat occupant to sit thereon.

20. The seat unit of claim 19, wherein the pad back includes a first upper side wing coupled to the first upright lower side wing along the first upper fold line, a second upper side wing coupled to the second upright lower side wing along the second upper fold line, and a backrest arranged to lie between the first and second upper side wings and coupled to the pad bottom along the main fold line and to each of the first and second upper side wings, respectively, along first and second vertical fold lines.

21. A seat unit comprising a seat including a pad-receiving surface and a reversible seat pad comprising an upper cushion including, in series, a first upright lower side wing, a first upper side wing coupled to the first upright lower side wing along a first upper fold line, a backrest coupled to the first upper side wing along a first vertical fold line, a second upper side wing coupled to the backrest along a second vertical fold line, and a second upright lower side wing coupled to the second upper side wing along a second upper fold line, and a pad bottom coupled to the first upright lower side wing along a first lower fold line, to the backrest along a main fold line, and to the second upright lower side wing along a second lower fold line, the upper cushion and the pad bottom cooperating to define a first seating side and a second seating side, the reversible seat pad being foldable along the main and first and second lower and upper fold lines and movable relative to the seat between a first position wherein the second seating side faces toward the pad-receiving surface and the first seating side faces away from the pad-seating surface to permit a seat occupant to sit thereon and a second position wherein the first seating side faces toward the pad-receiving surface and the second seating side faces away from the pad-receiving surface to permit a seat occupant to sit thereon wherein the pad bottom includes first and second sheets of material, a padding material, and a perimeter band, the first sheet of material is coupled to the second sheet of material to trap the padding material therebetween and establish a perimeter edge, the perimeter band is coupled to portions but not all of the perimeter edge and to establish first, second, and third band sections, the first upright lower side wing is coupled to the first band section, the backrest is coupled to the second band section, and the second upright lower side wing is coupled to the third band section.

22. The seat unit of claim 21, wherein the first upright lower side wing and the first upper side wing are arranged to lie in substantially coplanar relation to one another and wherein the second upright lower side wing and the second upper side wing are arranged to lie in substantially coplanar relation to one another.

23. The seat unit of claim 22, wherein the first upright lower side wing and the pad bottom cooperate to define a first belt-receiving side slot along the first lower fold line and wherein the second upright lower side wing and the pad bottom cooperate to define a second belt-receiving side slot along the second lower fold line.

24. The seat of claim 21, wherein the pad bottom includes first and second sheets of material, a padding material, and a perimeter band, the first sheet of material is coupled to the second sheet of material to trap the padding material therebetween and establish a perimeter edge, the perimeter band is coupled to a portion of the perimeter edge to establish first, second, and third band sections, the first upright lower side wing is coupled to the first band section, the backrest is coupled to the second band section, and the second upright lower side wing is coupled to the third band section.

25. The seat of claim 24, wherein the first band section of the perimeter band is uncoupled to a portion of the perimeter edge to establish a first belt-receiving side slot therebetween and the third band section of the perimeter band is uncoupled to another portion of the perimeter edge to establish a second belt-receiving side slot therebetween.

26. A seat unit comprising a seat including a pad-receiving surface and a reversible seat pad comprising a first sheet of material, a second sheet of material, a first padding material interposed between the first and second sheets of material, the first and second sheets being coupled to one another to trap the first padding material therebetween, a first stitching fastening the first sheet of material to the second sheet of material to establish a first upper fold line, a second stitching fastening the first sheet of material to the second sheet of material to establish a second upper fold line, the first and second upper fold lines partitioning the first and second sheets of material to define, in series, a first upright lower side wing, a pad back, and a second upright lower side wing, a third sheet of material, a fourth sheet of material, and a second padding material interposed between the third and fourth sheets of material, the third and fourth sheets of material being coupled to one another to trap the second padding material therebetween, the third and fourth sheets of material and the second padding material cooperating to form a pad bottom coupled to the pad back along a main fold line therebetween and to the first and second upright lower side wings along, respectively, first and second lower lines therebetween, the first and third sheets of material cooperating to define a first seating side, the second and fourth sheets of material cooperating to define a second seating side, and the reversible seat pad being foldable along the main and first and second lower and upper fold lines and movable relative to the seat between a first position wherein the second seating side faces toward the pad-receiving surface and the first seating side faces away from the pad-seating surface to permit a seat occupant to sit thereon and a second position wherein the first seating side faces toward the pad-receiving surface and the second seating side faces away from the pad-receiving surface to permit a seat occupant to sit thereon.

* * * * *